June 12, 1956     A. L. GRIFFON     2,749,615
SCISSORS
Filed Jan. 7, 1955
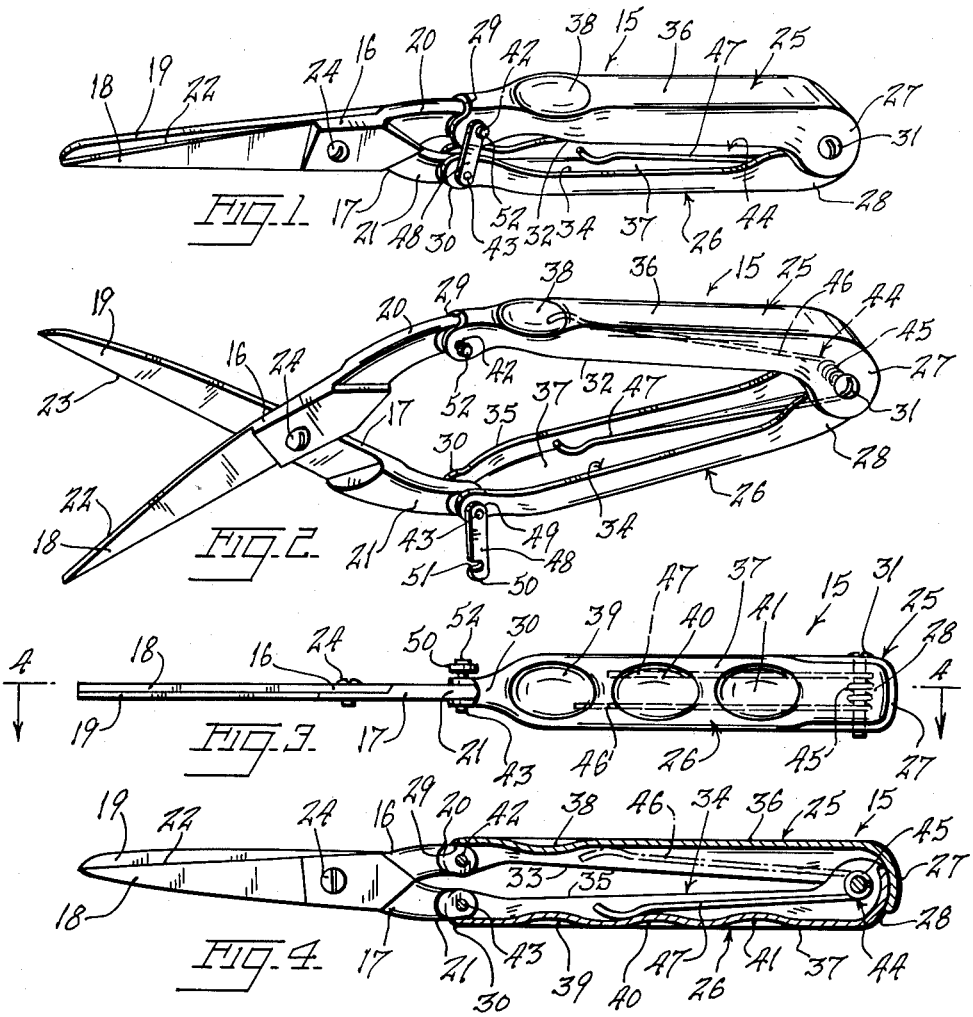
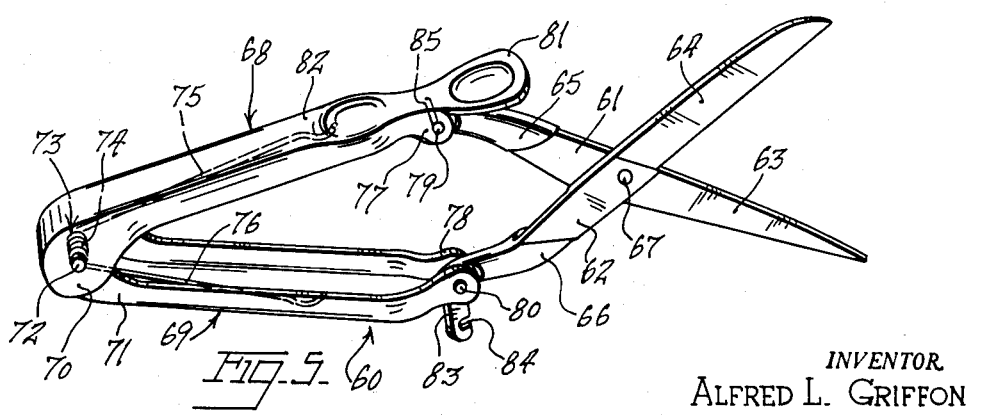
INVENTOR.
ALFRED L. GRIFFON
BY
*ATTORNEY*

United States Patent Office 2,749,615
Patented June 12, 1956

2,749,615

SCISSORS

Alfred L. Griffon, New York, N. Y.

Application January 7, 1955, Serial No. 480,330

4 Claims. (Cl. 30—262)

This invention relates to new and useful improvements in scissors and cutlery.

More particularly, the present invention proposes the construction of an improved pair of scissors which can easily be operated by one hand and which can be locked in closed position quickly and conveniently.

As a further object, the present invention proposes forming the scissors with a pair of hand gripping levers having resilient means at one end thereof tending continuously to bias the blades of the scissors in open position for cutting.

Still further, the present invention proposes constructing the hand grip levers so that a person can comfortably exert pressure with a one hand grip sufficient to cut the most difficult material or object to be severed.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view showing in closed position a pair of scissors constructed and arranged in accordance with the present invention.

Fig. 2 is a view similar to Fig. 1 but showing the scissors in open position.

Fig. 3 is a bottom plan view of the scissors shown in Figs. 1 and 2 with the scissors in closed position.

Fig. 4 is a longitudinal sectional view, taken on line 4—4 of Fig. 3.

Fig. 5 is a view similar to Fig. 2 but illustrating a modification of the present invention.

The pair of scissors, in accordance with the first form of the invention illustrated in Figs. 1 to 3, inclusive, is designated generally by the reference numeral 15.

Scissors 15 have two arms or blade members 16 and 17 with blade ends 18 and 19, respectively, and with shank ends 20 and 21, respectively. The blade ends 18 and 19 have the usual cutting edges 22 and 23.

Blade members 16 and 17 are pivotally connected together between their ends by the usual screw or fulcrum pivot member 24 so that the blade members will be crossed in the usual manner in pivoted position (see Fig. 2).

A pair of hand grip levers 25 and 26 are provided with overlapping ends 27 and 28 and other ends 29 and 30. The overlapping ends 27 and 28 of the levers 25 and 26 respectively are pivotally connected together by a pivot pin 31 which extends through them.

Levers 25 and 26 are U-shaped in cross section and for substantially all their length are channels with opposed side edges 32 and 33 and 34 and 35, respectively. The hand grip levers 25 and 26 have back portions 36 and 37. Back portion 36 of lever 25 is provided with one finger-resting and gripping indentation 38, and back portion 37 of lever 26 has three spaced finger-resting and gripping indentations 39, 40 and 41.

End 29 of hand grip lever 25 is pivotally connected by a hinge pin 42 with the shank end 20 of the blade member 16. End 30 of lever 26 is likewise pivotally connected by a hinge pin 43 with the shank end 21 of the other blade member 17.

A spring 44 is provided to form resilient means at the pivotally connected ends 27 and 28 of levers 25 and 26 to bias apart the other ends 29 and 30 of the levers and the shank ends 20 and 21 of the blade members 16 and 17.

Spring 44 has a coil 45 encircling the pivot pin 31 which connects the ends 27 and 28 of levers 25 and 26 and which is disposed inside the U-shaped levers. Spring 44 also has two spring arms 46 and 47. Spring arm 46 extends along the U-shaped lever 25 inside the channel and between the two side edges 32 and 33. Spring arm 47 extends along the U-shaped lever 26 inside the channel and between its side edges 34 and 35. Both spring arms terminate short of the shank ends 20 and 21 of blade members 16 and 17.

A swinging clamp 48 has one end 49 pivotally connected to the hinge pin 43 and another end 50 with a locking recess 51 therein. A locking pin 52 extends from the other hinge pin 42 removably to fit in the locking recess 51 of the swinging clamp to hold the blade members pivoted in the closed position shown in Figs. 1, 3 and 4.

The modification of the present invention illustrated in Fig. 5 is characterized by the provision of a pair of scissors 60 having two blade members 61 and 62 with blade ends 63 and 64 and shank ends 65 and 66. The blade members 61 and 62 are pivotally joined together by and fulcrumed on, the usual screw pivot 67.

A pair of hand grip levers 68 and 69 have ends 70 and 71 pivotally connected together by a pivot pin 72. The levers 68 and 69 are U-shapd channels in cross section and a spring 73 is provided with a coil 74 encircling the pivot pin 72 and with spring arms 75 and 76 extending therefrom along the levers 68 and 69 inside the channels thereof.

Levers 68 and 69 have other ends 77 and 78 connected pivotally by hinge pins 79 and 80 to the shank ends 65 and 66 of the blade members 61 and 62.

Lever 68 has a thumb grip extension 81 extending from its end 77 and overlying the shank end 65 of blade member 61. The extension 81 extends as a continuation of the back 82 of the lever 68 and adjacent to the extension on the back 82 of the lever 68 is a finger holding and gripping indentation.

A locking swing lever 83 is pivotally mounted on hinge pin and contains a recess 84 adapted to fit over an extension 85 of the other hinge pin.

When extra presure is needed, the thumb may be moved to the thumb lever extension 81 or when the scissors are used by persons with larger hands than those of its customary user the thumb extension 81 will provide a comfortable grip.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A pair of scissors comprising two blade members having blade ends and shank ends, a fulcrum pivot member pivotally connecting said blade members together between said ends, a pair of hand grip levers each having two ends, a pivot pin pivotally connecting the levers together at one end of each lever, hing pins pivotally connecting the other ends of the levers to the shank ends of the blade members, and resilient means at the pivotally connected ends of the levers to bias apart the other ends of said levers and the shank ends of the blade members connected thereto, said levers being U-shaped in cross section with opposed side edges, said resilient member being a spring with a coil about said pivot pin and spring arms extending along and in the channel of said U-shaped hand grip levers, said hand grip levers having back portions with finger-resting and gripping indentations therein, one of said levers having one of such finger resting and gripping indentations and the other lever having a plurality of such finger-resting and gripping indentations.

2. A pair of scissors comprising two crossed blade members having blade ends and shank ends and fulcrumed and pivotally connected together between said ends, a pair of hand grip levers having pivotally connected ends and other ends pivotally connected to the shank ends of the blade members, and resilient means at the pivotally connected ends of the pair of hand grip levers biasing apart the other ends of said levers and the shank ends of the blade members connected thereto, said hand grip levers being U-shaped in cross section and having back portions with finger-resting indentations formed therein, said resilient means being disposed in and between said U-shaped hand grip levers, and a swinging clamp having one end pivotally connected with one of said shank ends of the blade members and having another end removably connected with the other shank end of the blade members.

3. A pair of scissors comprising two crossed blade members having blade ends and shank ends and fulcrumed and pivotally connected together between said ends, a pair of hand grip levers having pivotally connected ends and other ends pivotally connected to the shank ends of the blade members, resilient means at the pivotally connected ends of the pair of hand grip levers biasing apart the other ends of said levers and the shank ends of the blade members connected thereto, said hand grip levers being U-shaped in cross section and having back portions with finger-resting indentations formed therein, said resilient means being disposed in and between said U-shaped hand grip levers, and a swinging clamp having one end pivotally connected with one of said shank ends of the blade members and having another end removably connected with the other shank end of the blade members, one of said hand grip levers having a thumb lever extension extending from the end of the lever connected with the shank end of one of the blade members and overlying such shank end.

4. A pair of scissors comprising two blade members having blade ends and shank ends, a fulcrum pivot member pivotally connecting said blade members together between said ends, a pair of hand grip levers each having two ends, a pivot pin pivotally connecting the levers together at one end of each lever, hinge pins pivotally connecting the other ends of the levers to the shank ends of the blade members, and resilient means at the pivotally connected ends of the levers to bias apart the other ends of said levers and the shank ends of the blade members connected thereto, said levers being U-shaped in cross section with opposed side edges, said resilient member being a spring with a coil about said pivot pin and spring arms extending along and in the channel of said U-shaped hand grip levers, said hand grip levers having back portions with finger-resting and gripping indentations therein, one of said levers having one of such finger resting and gripping indentations and the other lever having a plurality of such finger-resting and gripping indentations, a swinging clamp having one end pivotally secured to one of said hinge pins and another end with a locking recess therein, and a locking pin extending from the other hinge pin removably to fit in the locking recess of the swinging clamp and hold the blade members pivoted in a closed blade position, one of said hand grip levers having a thumb lever extension extending from the end of the lever connected with the shank end of one of the blade members and overlying such shank end.

References Cited in the file of this patent

UNITED STATES PATENTS

| | | |
|---|---|---|
| 1,539,302 | Curtis | May 26, 1925 |
| 1,572,546 | McKenney | Feb. 9, 1926 |
| 1,915,450 | Schnefel | June 27, 1933 |
| 2,370,026 | Elia | Feb. 20, 1945 |
| 2,540,255 | Groves | Feb. 6, 1951 |
| 2,650,423 | Phillips | Sept. 1, 1953 |